United States Patent Office 3,297,389
Patented Jan. 10, 1967

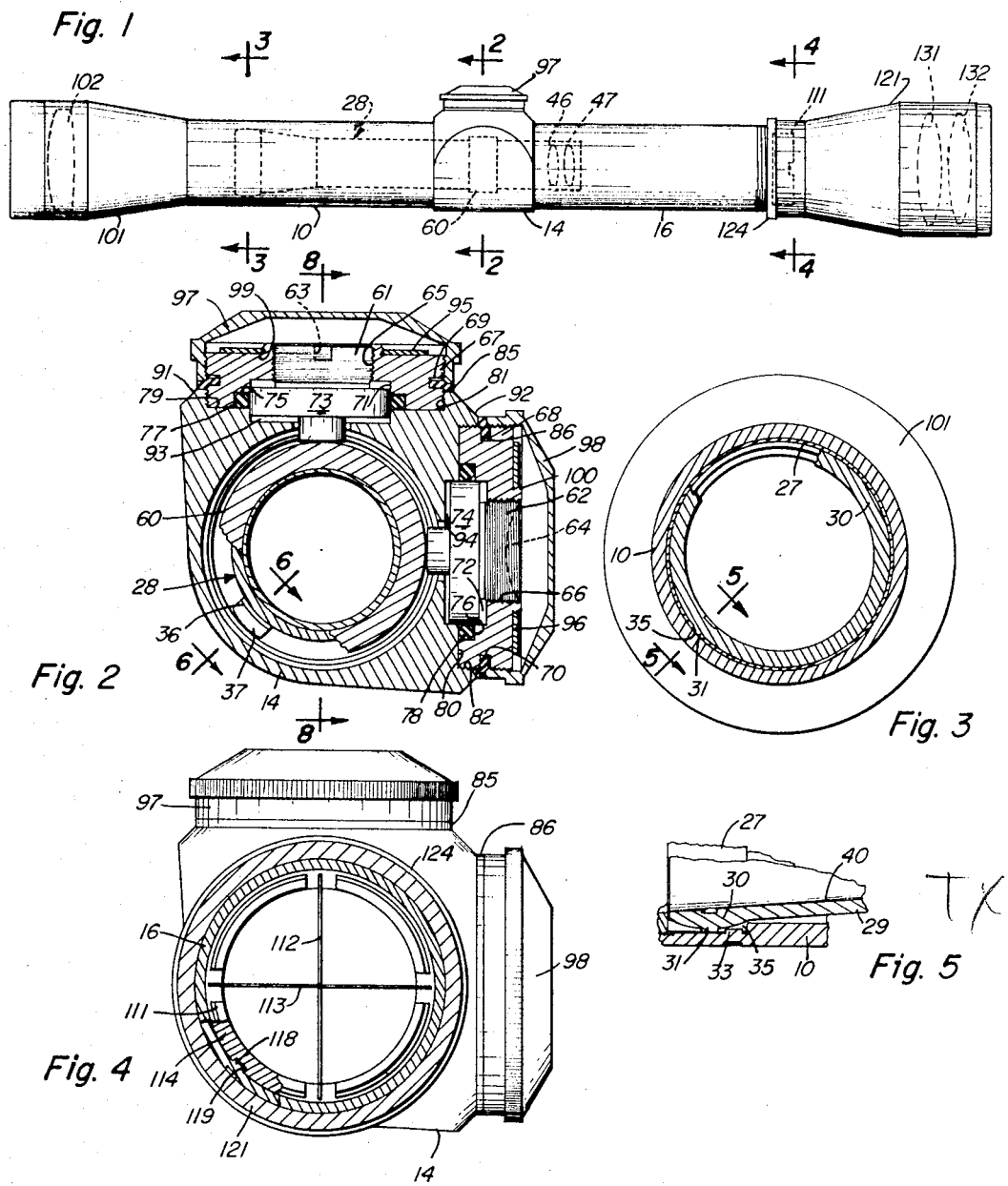

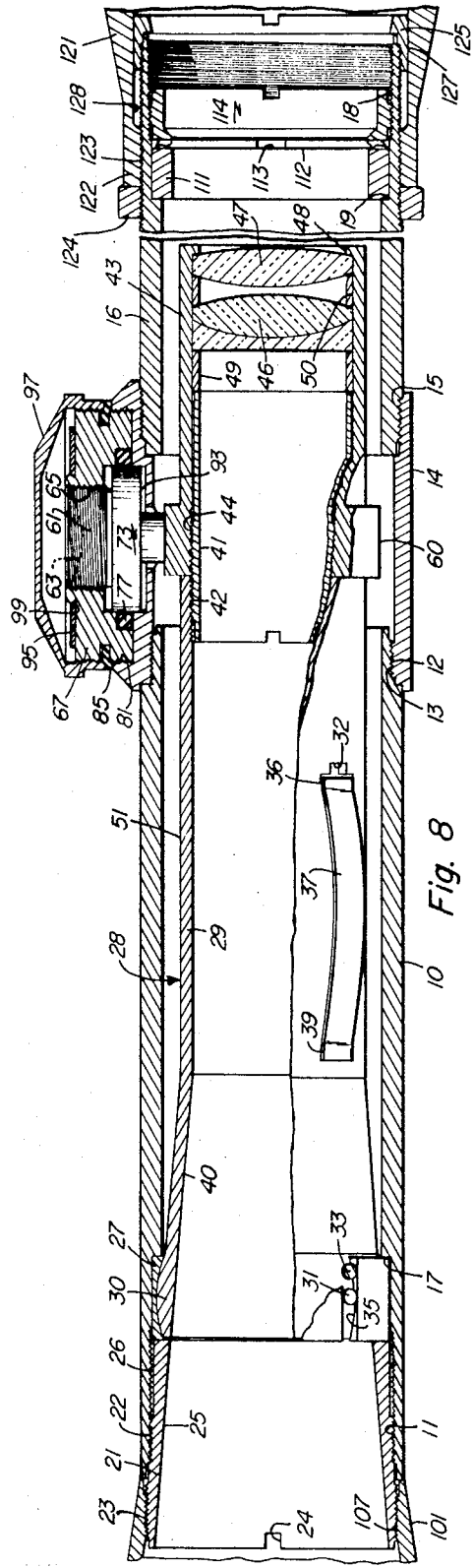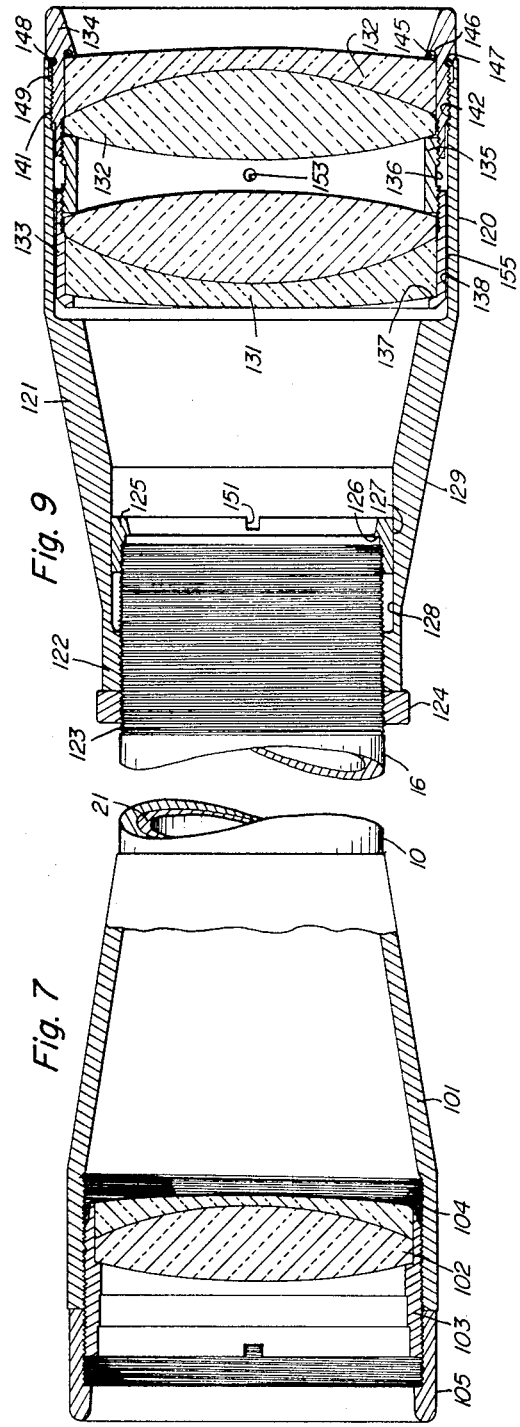

3,297,389
RIFLE SCOPE WITH BALL JOINT MOUNTING FOR ADJUSTABLE ERECTOR LENS TUBE
Dale E. Gibson, Portland, Oreg., assignor to Leupold & Stevens Instruments, Inc., Portland Oreg., a corporation of Oregon
Filed Jan. 11, 1963, Ser. No. 250,867
2 Claims. (Cl. 350—10)

This invention relates to a rifle scope, and more particularly to a rifle scope which may be compensated for windage and elevation and focused.

An object of the invention is to provide a new and improved rifle scope.

Another object of the invention is to provide a rifle scope having an eyepiece adjustable relative thereto for focusing and held against accidental removal from the remainder of the rifle scope.

A further object of the invention is to provide a rifle scope having improved coupling structure adapted to hold parts of the tubular housing portion of the scope together and also lock an adjustable erector lens assembly in oriented position in the housing portion.

Another object of the invention is to provide a rifle scope in which an adjustable erector lens assembly and a reticle assembly are independently mounted.

A further object of the invention is to provide a rifle scope in which an adjustable erector lens assembly and a reticle assembly are insertable into a tubular housing portion of the scope from opposite ends of the housing portion.

In a rifle scope illustrating certain features of the invention, an objective lens shell nut is adapted to connect together an objective tube and an objective shell and also secure an erector lens assembly in the objective tube. A reticle assembly is mounted in the rear end of an eyepiece tube independently of the erector lens assembly and the rear end of the eyepiece tube is exteriorally threaded to adjustably receive an eyepiece shell threaded thereon with a forward stop fixed on the eyepiece tube and a rear stop threaded onto the rear end portion of the threaded portion of the eyepiece tube and positioned inside the eyepiece tube. The eyepiece tube holds an eyepiece lens holder sealed to the rear end portion of the eyepiece shell.

A complete understanding of the invention may be obtained from the following detailed description of a rifle scope forming a specific embodiment thereof, when read in conjunction with the appended drawings in which:

FIG. 1 is a side elevation view of a rifle scope forming one embodiment of the invention;

FIGS. 2, 3 and 4 are enlarged, vertical sectional views taken along lines 2—2, 3—3 and 4—4, respectively, of FIG. 1;

FIG. 5 is an enlarged, longitudinal sectional view taken alone lines 5—5 of FIG. 3;

FIG. 6 is an enlarged, fragmentary, sectional view taken along line 6—6 of FIG. 2;

FIGS. 7, 8 and 9 are enlarged, fragmentary, vertical sectional views of the rifle scope of FIG. 1.

Referring now in detail to the drawing, the rifle scope shown therein includes an objective tube 10 having at its front end an internal threaded portion 11 (FIG. 8) and at its rear end an external threaded portion 12. The external threaded portion 12 is threaded into a tapped counterbore 13 formed in a turret housing 14, which has a rear, tapped counterbore 15 into which is threaded the front end portion of an eyepiece tube 16. The tube 10 also is provided with a shoulder 17 formed at the rear end of a front counterbore therein and the eyepiece tube 16 has tapped counterbore 18 at the rear end thereof.

A shoulder 19 is formed at the front end of the counterbore 18.

A tubular, objective lens shell nut 21 is provided with a rear externally threaded portion 22 of a predetermined diameter and also has a forward externally threaded portion 23. The nut 21 also has laterally aligned notches 24 for reception of a driving tool and has a tapered bore 25 therein. The nut 21 also has a reduced diameter shank portion 26 slidable in the tube 10 and adapted to engage a ball ring or collar 27 of an erector lens assembly 28 and force the ball ring against the shoulder 17 of the tube 10 to mount the assembly 28 in the objective tube 10. A key 33 formed on the interior of the tube 10 projects into a keyway 35 in the ball ring 27 to precisely orient the ball ring in the tube 10. The ring 27 is longitudinally split to form the keyway 35 and to receive a pin 31 slidably and rotatably therein. The ball ring 27 forms the socket portion of a universal or ball-and-socket joint of the erector lens assembly 28. An erector lens tube 29 is provided with a spherical portion 30 universally adjustable in the ball ring 27 and has integral therewith the pin 31, which projects into the keyway 35 in the ball ring 27. The ring 27 holds the erector lens tube 29 against longitudinal movement in the objective tube 10. The tube 29 is thin-walled, and has a frustoconical forward end portion 40 and a cylindrical section 51 having an external diameter substantially smaller than the internal diameter of the tube 10 to permit extensive pivotal movement of the tube 29 relative to the tube 10.

The tube 29 has a T-shaped slot 32 (FIGS. 6 and 8) therein serving as a vent and also to receive an inwardly directed tang portion 36 of an erector spring 37 which is bowed so as to engage the interior of the tube 10 and bias the erector lens tube 29 upwardly and to the right relative to the tube 10, as viewed in FIG. 2. The tang portion fits closely in the slot 32 to keep the spring in a position extending along the tube 29. The spring 37 has an arcuate end portion 39 slidably engaging the tube 29 at the end of the spring nearest the ball ring 27. An erector lens nut 41 (FIG. 8) is threaded into a tapped portion 42 of the tube 29, and threaded on the front threaded portion 44 of the nut 41 is an erector lens holder 43 which is jammed against the rear end of the tube 29 to lock the erector lens holder 43, the erector lens nuts 41 and the erector lens tube 29 together. Lens componets 46 and 47 are held in the erector lens holder by the erector lens nut 41, an inturned flange 48 of the lens holder 43 and spacers 49 and 50.

The erector lens tubs 29, the erector lens nut 41 and the erector lens holder 43 are urged by the spring 37 upwardly and to the right, as viewed in FIG. 2, to move collar portion 60 into engagement with adjustment screws 61 and 62 mounted at right angles to each other. The adjustment screws 61 and 62 have driving slots 63 and 64, and the inner ends thereof are flat and normal to the longitudinal axes thereof. The screws 61 and 62 are threaded into tapped bores 65 and 66 formed in internally flanged housings or plug members 67 and 68 having annular grooves 69 and 70 therein. The plug members 67 and 68 also have counterbores 71 and 72 therein for guiding guide portions or collars 73 and 74 of the screws 61 and 62. The plug members 67 and 68 have counterbores 75 and 76 respectively therein for receiving resilient O-rings 77 and 78 and for pressing the O-rings sealingly into engagement with faces 79 and 80 forming the ends of threaded counterbors 81 and 82 formed in the turret housing 14. The plug members 67 and 68 also squeeze the O-rings 77 and 78 into sealing and frictional gripping engagment with the guide portions 73 and 74. Sealing washers 85 and 86 project into the annular grooves 69 and 70 in the plug members 67 and 68, and seat against the ends of bosslike portions 91 and 92 of the turret housing 14, caps 97 and 98 being threaded on the plug members 67 and 68.

The collars 73 and 74 are guided by the counterbores 71 and 72, respectively, and by the sidewalls of outwardly facing counterbores 93 and 94, respectively, in the turret housing 14. The collars 73 and 74 are movable between outermost positions engaging the bottoms of the counterbors 71 and 72, respectivly, and innermost positions engaging the bottoms of the counterbores 93 and 94, respectively. The plug members 67 and 68 are screwed into the threaded counterbores 81 and 82 sufficiently to press the ends of the plug members very tightly against the ends of the counterbores 81 and 82 to lock the plug members against unthreading except by very large forces. This locking of the plug members prevents unscrewing the plug members by attempting to adjust the screws 61 and 62 beyond their outermost positions in which the collars 73 and 74 engage the ends of the counterbores 71 and 72. Split disc, calibrated elevation and windage dials 95 and 96 are held frictionally on the plug members in undercut grooves 99 and 100 of the plug members 67 and 68, and can be turned manually by deliberate action of the user. The ends of the screws 61 and 62 each have an engraved radial line or pointer cooperating with the indicia on the corresponding dial to indicate the adjusted position of that adjustment screw.

By adjustment of the screw 61, the erector lens components 46 and 47 (FIG. 8) may be adjusted vertically in the tubes 10 and 16 to compensate for distance or elevation. To compensate for windage, the screw 62 (FIG. 2) is adjusted to move these lens components laterally or horizontally in the tubes 10 and 16. The spring 37 maintains the erector lens holder 43 in engagement with the flat inner ends of the screws 61 and 62 at all times, and the O-rings 77 and 78 hold the screws 61 and 62 against accidental movement.

A tapered objective shell 101 (FIG. 7) carries an objective lens component 102 mounted in an objective lens holder 103 threaded into a tapped portion 104 of the shell 101, and lock nut or sunshade 105 is threaded onto the front end of the objective lens holder 103. The lens component 102 is secured in the lens holder 103 by suitable means such as cement or the like. A tapped, reduced end portion 107 (FIG. 8) of the shell 101 is screwed onto the threaded portion 23 of the lens shell nut 21, and the shell 101 is held tightly against the end of the objective tube 10 to lock the shell 101 and the tube 10 securely to the lens shell nut.

A ringlike reticle holder 111 (FIG. 1, 4 and 8) mounted in counterbore 18 in the eyepiece tube 16 at the rear focal plane of the erector lens carries crosshairs 112 and 113 forming the reticle and soldered at their ends to the holder 111. The reticle holder 111 is locked against the shoulder 19 by a nut 114 threaded into tapped counterbore 18 in eyepiece tube 16. A key 118 fixed to the tube 16 projects into keyway 119 formed in the reticle holder 111 to precisely locate the reticle in the tube 16. The keys 33 and 118 and keyways 35 and 119 are spaced 135° around the rifle scope from the adjustment screws 61 and 62, and the centerline of the spring 37 is also spaced 135° around the rifle scope from the screws 61 and 62.

An eyepiece shell 121 (FIGS. 8 and 9) has an internally threaded, cylindrical front end portion 122 threaded onto an externally threaded portion 123 of the eyepiece tube 16. The eyepiece shell has a large, counterbored, cylindrical rear end portion 120 connected to the portion 122 by a tapered portion 129. The eyepiece shell 121 may be threaded for focusing purposes along the threaded portion 123 and is stopped at its most rearward position by a rear stop nut 125 threaded onto the rear end portion of the tube 16. The nut 125 has a shoulder 126 abutting the rear end of the tube 16 to lock the nut 125 on the tube. A lock nut 124 threaded on the threaded portion 123 is adapted to lock the shell 121 in adjusted position. The nut 125 has an external cylindrical guide portion 127 on which fits closely and slidably a counterbore guide portion 128 of the eyepiece shell 121. The nut 125 acts as an outboard guide or bearing for the shell 121 to support the shell in alignment with the tube 16. The nut 125 also prevents eyepiece shell 121 from being accidentally screwed completely off the tube 16.

A pair of eyepiece lens components 131 and 132 are held as a unit by a front eyepiece lens holder 133 and a rear eyepiece lens holder 134 threaded onto an externally threaded lens spacer 135 having an annular groove 136 therein. The lens holder 133 has a front flange 137 and fits closely and slidably in a counterbore 138 in the eyepiece shell 121. The rear eyepiece lens holder 134 has an externally threaded portion 141 which screws into a tapped bore 142 in the eyepiece shell 121, and the lens holder 134 also has a grooved or undercut flange portion 145 compressing an O-ring 146 against the lens component 132 to form a seal therewith. The lens holder 134 also includes an external shoulder portion 147 compressing an O-ring 148 in an enlarged portion 149 of the counterbore 138 of the eyepiece shell 121. The eyepiece lens components 131 and 132 are held as a unit by the lens holders 133 and 134 and the spacer 135, and before this unit is assembled into the eyepiece shell 121 the stop nut 125 is threaded onto the end of the eyepiece tube 16, the nut 125 being provided with laterally aligned notches 151 for reception of a driving tool as is well known in the lens art.

The erector lens holder 43 has a substantially smaller external diameter than the internal diameter of the eyepiece tube 16 so that the erector lens components 46 and 47 may be adjusted over a wide range in any direction to compensate for possible errors in the mount (not shown) for the rifle scope as well as to provide the elevation and windage adjustments. This wide range of adjustment is possible without loss of field also since the annular or cylindrical mounting elements 41, 43, 48, 49 and 50 are thin-walled. Only the collar portion 60, which is engaged by the adjustment screws 61 and 62, needs to be thick-walled and this is positioned substantially close to the pivot pin 31 than the portion of the erector lens holder 43 carrying the lens components so that the collar portion 60 does not move so far as the lens mounting end of the holder 43 for any given adjustment of the holder 43 relative to the eyepiece tube 16 and turret housing 14. Also, the internal diameter of the turret housing is larger than that of the eyepiece tube 16 so that the collar portion 60 is permitted a wider extreme of movement than the right-hand portion of the holder 43. The effective diameter of the light path ahead of the erector lens components 46 and 47 also is kept as large as possible for the adjustment range of these lens components by the thin walled, tapering interior construction of the shell 101, the lens shell nut 21 and the erector lens tube 29.

The interior of the rifle scope is filled with a dry gas such as nitrogen or the like under a pressure somewhat greater than that of the atmosphere as is well known in the art, and the sealing elements 77, 78, 85, 86, 146 and 148 form gas-tight seals. The other joints of the rifle scope are sealed by grease so that the entire interior of the rifle scope is sealed and the dry gas is retained therein under pressure. The lens spacer 135 has a hole 153 therethrough for the evacuation of air from between the lens components 131 and 132. Longitudinally extending grooves or knurling 155 in the exterior portion of the lens holder 122 provide passages for air and nitrogen between the groove 136 and the portion of the eyepiece shell 121 ahead of lens component 131. To evacuate air from the rifle scope and fill the scope with nitrogen, either one of the plug members 67 and 68 or the lens holder 134 is loosened sufficiently to break its seal, the rifle scope is placed in a closed chamber which is first evacuated and then filled with nitrogen under pressure and the loosened element is tightened to seal the nitrogen in the rifle scope.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a rifle scope,
elongated tubular housing means having a front end and a rear end,
a split ball ring mounted in the front end of the housing means, the housing means having keying means projecting inwardly between the ends of the split ball ring,
an erector lens tube having a ball portion universally adjustable in the ball ring and extending rearwardly in the housing means from the ball ring, the ball portion having keying means projecting outwardly between the ends of the split ring,
erector lens means in the rear end portion of the erector lens tube,
recticle means fixed in the rear end portion of the housing means,
and means located intermediate the ends of the housing means for adjusting the rear end of the erector lens tube transversely of the housing means.
2. In a rifle scope,
tubular housing means,
a pair of adjustment screw means extending transversely into the tubular housing means in positions in which the screw means are perpendicular to each other,
a split ball ring mounted in the tubular housing means with the ends of the split ball ring forming a keyway,
a key fixed to the tubular housing means in a position spaced 135° from each of the pair of adjustment screw means and projecting into the keyway to prevent rotation of the ball ring in the tubular housing means,
optical means,
and elongated holding means extending longitudinally in said tubular housing means, said hold means carrying the optical means near one end thereof and having a spherical portion at the other end thereof,
the spherical portion fitting in the ball ring for universal pivotal movement relative thereto and having a pin member extending into the keyway and movable therealong and keying the holding means to the ball ring.

References Cited by the Examiner

UNITED STATES PATENTS

| 1,167,991 | 1/1916 | Grebe | 88—32 |
| 1,831,627 | 11/1931 | Kruening | 88—57 X |
| 1,948,588 | 2/1934 | Martin | 88—32 |
| 2,696,052 | 12/1954 | Czarnikow. | |
| 3,184,852 | 5/1965 | Hageman | 33—50.5 |

FOREIGN PATENTS 446,598   2/1948   Canada.

DAVID H. RUBIN, *Primary Examiner.*

J. G. BOLTEN, *Assistant Examiner.*